United States Patent
Qiu et al.

(10) Patent No.: US 9,088,588 B2
(45) Date of Patent: Jul. 21, 2015

(54) METHOD AND APPARATUS FOR REGISTERING COMMUNICATION DEVICES IN A COMMUNICATION SYSTEM

(71) Applicant: AT&T Intellectual Property I, LP, Atlanta, GA (US)

(72) Inventors: Chaoxin Charles Qiu, Austin, TX (US); Robert F. Dailey, Austin, TX (US); Satish Parolkar, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 377 days.

(21) Appl. No.: 13/687,276

(22) Filed: Nov. 28, 2012

(65) Prior Publication Data

US 2014/0146812 A1    May 29, 2014

(51) Int. Cl.
*H04L 29/06*    (2006.01)

(52) U.S. Cl.
CPC ........ *H04L 65/1073* (2013.01); *H04L 65/1016* (2013.01)

(58) Field of Classification Search
CPC .................. H04L 65/1016; H04L 65/1073
USPC ........................................................ 709/249
See application file for complete search history.

(56) References Cited

U.S. PATENT DOCUMENTS

| | | | |
|---|---|---|---|
| 7,995,466 B2 | 8/2011 | Baker et al. | |
| 2008/0155310 A1 | 6/2008 | Langen et al. | |
| 2010/0034079 A1* | 2/2010 | Boucadair et al. | 370/218 |
| 2010/0070563 A1* | 3/2010 | Baker et al. | 709/203 |
| 2011/0026395 A1 | 2/2011 | Qiu et al. | |
| 2011/0078229 A1* | 3/2011 | Qiu et al. | 709/203 |
| 2012/0294302 A1* | 11/2012 | Ku et al. | 370/352 |

FOREIGN PATENT DOCUMENTS

WO    WO-98/26553    6/1998

* cited by examiner

*Primary Examiner* — Paul H Masur
*Assistant Examiner* — Kabir Jahangir
(74) *Attorney, Agent, or Firm* — Guntin & Gust, PLC; Ralph Trementozzi

(57) ABSTRACT

A system that incorporates the subject disclosure may include, for example, a method for receiving and granting, by a first session border controller, registration requests from a plurality of communication devices, where the plurality of communication devices are assigned to a second session border controller as a primary source for communication services, and where the registration requests are received responsive to the second session border controller being unable to provide services to the plurality of communication devices. The method can further include receiving, by the first session border controller, a re-registration request from one of the plurality of communication devices, and transmitting, by the first session border controller, a message to the one of the plurality of communication devices responsive to receiving the re-registration request to cause the one of the plurality of communication device to register with the second session border controller. Other embodiments are disclosed.

19 Claims, 6 Drawing Sheets

200

600

METHOD AND APPARATUS FOR REGISTERING COMMUNICATION DEVICES IN A COMMUNICATION SYSTEM

FIELD OF THE DISCLOSURE

The subject disclosure relates to a method and apparatus for registering communication devices in a communication system.

BACKGROUND

In internet protocol multimedia subsystem (IMS) networks it is common to assign communication devices a primary session border controller (SBC) and one or more secondary SBCs. When the communication device is unable to register with its primary SBC, the communication device can resort to registering with a secondary SBC. When the communication device is unable to re-register with the secondary SBC, the communication device can resort to another secondary SBC. This process can continue in a round robin fashion until the communication device returns to the primary SBC.

BRIEF DESCRIPTION OF THE DRAWINGS

Reference will now be made to the accompanying drawings, which are not necessarily drawn to scale, and wherein.

DETAILED DESCRIPTION

Figure 1:
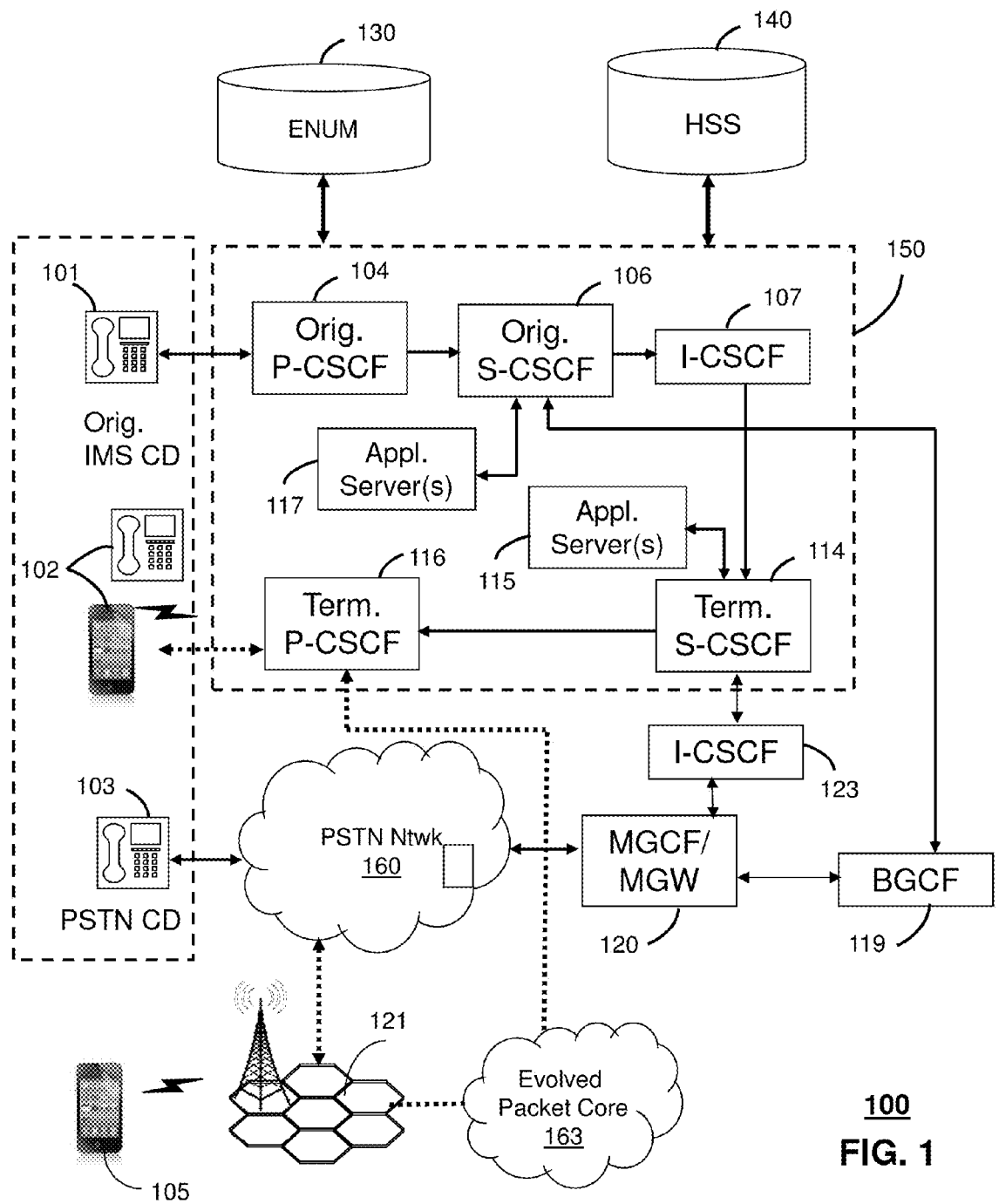
FIGS. 1-2 depict illustrative embodiments of communication systems.

The subject disclosure describes, among other things, illustrative embodiments for forcing a communication device to re-register with its primary session border controller. Other embodiments are included in the subject disclosure.

One embodiment of the subject disclosure includes a first session border controller comprising a memory to store instructions, and a processor coupled to the memory. Responsive to executing the instructions, the processor can perform operations including receiving and granting first registration requests from a first plurality of communication devices at a first port, where the first plurality of communication devices are assigned to the first session border controller as a primary source for communication services, and receiving and granting second registration requests from a second plurality of communication devices at a second port, where the second plurality of communication devices are assigned to a second session border controller as a primary source for communication services, and where the second registration requests are received responsive to the second session border controller being unable to provide services to the second plurality of communication devices. The processor can also perform operations including receiving and granting a first re-registration request from a first communication device of the first plurality of communication devices. The processor can further perform operations including receiving a second re-registration request from a second communication device of the second plurality of communication devices, and denying the second re-registration of the second communication device responsive to the second communication device satisfying a communication condition.

One embodiment of the subject disclosure includes a computer-readable storage medium comprising computer instructions, which when executed by a first session border controller, cause the first session border controller to perform operations including receiving and granting first registration requests from a first plurality of communication devices, where the first plurality of communication devices are assigned to the first session border controller as a primary source for communication services, and receiving and granting second registration requests from a second plurality of communication devices, where the second plurality of communication devices are assigned to a second session border controller as a primary source for communication services, and where the second registration requests are received responsive to the second session border controller being unable to provide services to the second plurality of communication devices. The processor can also perform operations including receiving and granting a first re-registration request from a first communication device of the first plurality of communication devices. The processor can also perform operations including receiving a second re-registration request from a second communication device of the second plurality of communication devices, and transmitting a message to the second communication device responsive to receiving the second re-registration request to cause the second communication device to register with the second session border controller.

One embodiment of the subject disclosure includes a method for receiving and granting, by a first session border controller comprising a processor, registration requests from a plurality of communication devices, where the plurality of communication devices are assigned to a second session border controller as a primary source for communication services, and where the registration requests are received responsive to the second session border controller being unable to provide services to the plurality of communication devices. The method can further include receiving, by the first session border controller, a re-registration request from one of the plurality of communication devices, and transmitting, by the first session border controller, a message to the one of the plurality of communication devices responsive to receiving the re-registration request to cause the one of the plurality of communication devices to register with the second session border controller.

FIG. 1 depicts an illustrative embodiment of a communication system 100 employing an IMS network architecture to facilitate the combined services of circuit-switched and packet-switched communication services. Communication system 100 can comprise an HSS 140, a tElephone NUmber Mapping (ENUM) server 130, and other common network elements of an IMS network 150. The IMS network 150 can establish communications between or among IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 may not be necessary when a communication session involves IMS CD to IMS CD communications. A communication session involving at least one PSTN CD, however, may utilize the MGCF 120. It will be appreciated that IMS CDs 101, 102 can support packet-switched voice and packet-switched data communications and/or Long Term Evolution (LTE) communications protocol. Various IMS CDs 101, 102 may be embodied as cellular phones, smartphones, tablet computers, laptop computers, portable communication devices, appliances, and the like, whether wired or wireless.

IMS CDs 101, 102 can register with the IMS network 150 by establishing communications with a Proxy Call Session Control Function (P-CSCF) which communicates with an Interrogating CSCF (I-CSCF). The I-CSCF in turn can communicate with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which can communicate with a corresponding originating S-CSCF 106. The originating S-CSCF 106 can submit the SIP INVITE message to one or more application servers (AS) 117 that can provide a variety of services to IMS subscribers.

For example, one or more application servers 117 can be used to perform originating call feature treatment functions on the calling party number received by the originating S-CSCF 106 according to the SIP INVITE message. Originating treatment functions can include determining whether the calling party number has international calling services, call ID blocking, calling name blocking, 7-digit dialing, etc. (e.g., *72 for forwarding calls, *73 for canceling call forwarding, *67 for caller ID blocking, and so on). Based on initial filter criteria (iFCs) in a subscriber profile associated with a CD, one or more application servers may be invoked to provide various call originating feature services.

The originating S-CSCF 106 can submit queries to the ENUM system 130 to translate an E.164 telephone number in the SIP INVITE message to a SIP Uniform Resource Identifier (URI) if the terminating CD is IMS-compliant. The SIP URI can be used by an I-CSCF 107 to submit a query to the HSS 140 to identify a terminating S-CSCF 114 associated with a terminating IMS CD such as CD 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in a subscriber profile, one or more terminating application servers 115 may also be invoked to provide various call terminating feature services, such as call forwarding no answer, do not disturb, music tones, simultaneous ringing, sequential ringing, etc.

If the terminating communication device is instead a PSTN CD such as CD 103 or CD 105 (e.g., where the cellular phone 105 or other communication device only supports circuit switched voice communications via base station 121), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

It is further noted that cellular access base station 121 of FIG. 1 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies can be used.

In the case where CD 105 and base station 121 support packet-switched voice and packet-switched data communications (e.g., LTE) or are otherwise IMS-compliant, the CD 105 may communicate via the cellular base station 121 and an Evolved Packet Core (EPC) 163 directly with the IMS network 150 as noted by the dotted lines interconnecting them. In this instance, CD 105 can operate as an IMS-compliant communication device.

It is further noted that the communication system 100 can be adapted to support video conferencing. The CDs of FIG. 1 can further be communicatively coupled to the cellular base station 121, a femtocell (not shown), a WiFi router, a DECT base unit, or another suitable wireless access unit to establish communications with the IMS network 150 of FIG. 1.

It is further understood that alternative forms of a CSCF can operate in a device, system, component, or other form of centralized or distributed hardware and/or software. A respective CSCF may be embodied as a system having one or more computers or servers, either centralized or distributed, where each computer or server may be configured to perform or provide, in whole or in part, any method, step, or functionality described herein. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The IMS network 150 of FIG. 1 also represents a single instance of network elements commonly utilized for end-to-end communications. In practice, however, there can be many instances of the IMS network elements shown in FIG. 1. Several instances of S-CSCF's and application servers can be clustered into a server office which provides communication services to potentially millions of subscribers. The P-CSCF's can be clustered in access offices with session border controllers (not shown in FIG. 1).

Figure 2:
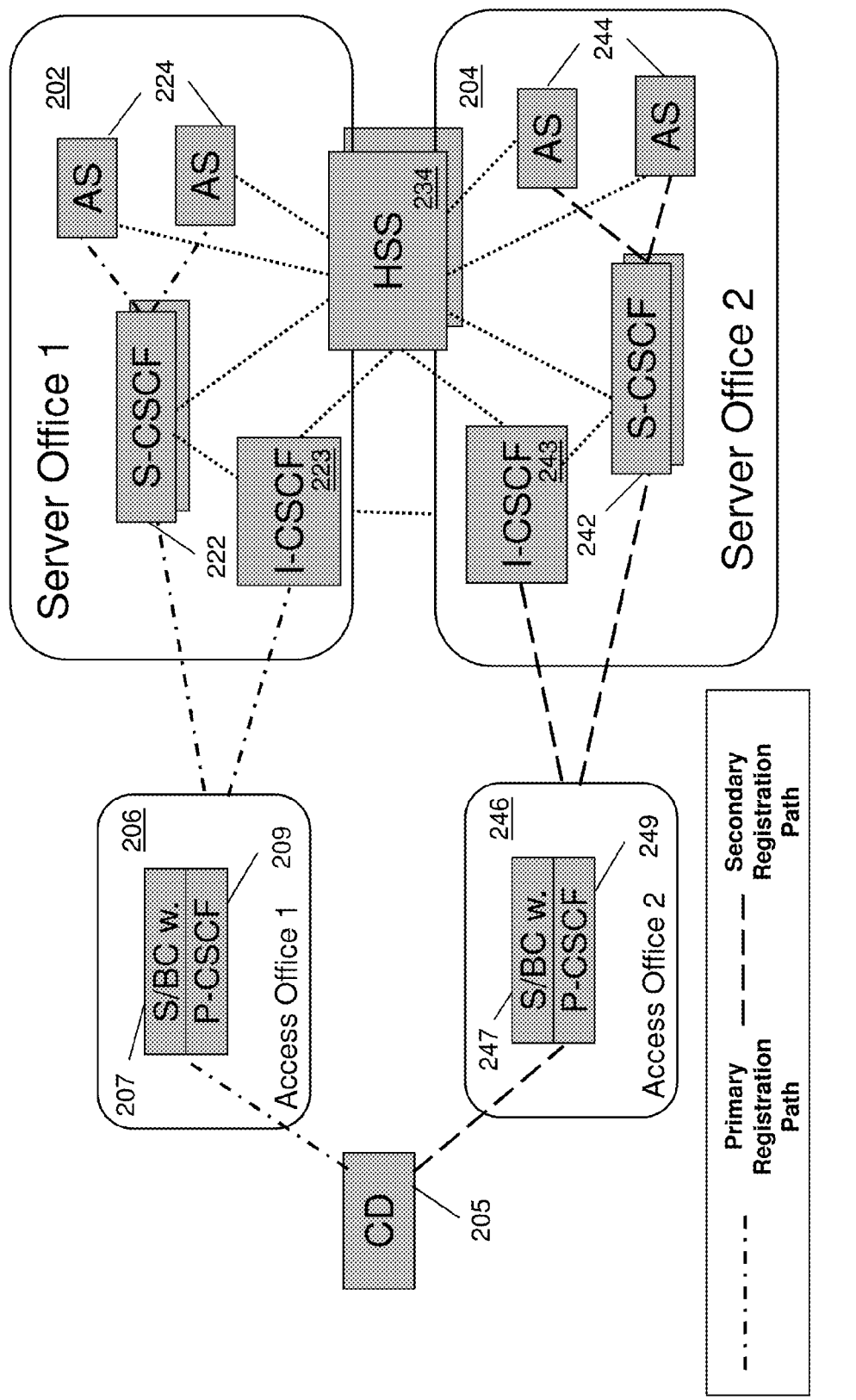

FIG. 2 illustrates first and second server offices 202 and 204. A communication device 205 can gain access to either of server offices 202 or 204 by way of first and second access offices 206 and 246, each having a session border controller and P-CSCF pair. One or more instances of I-CSCF and HSS can be accessed by the network elements of either of server offices 202 and 204, or the access offices 206 and 246 as shown by the dotted lines.

Server offices 202 and 204 can provide communication services to CD 205 by way of the S/BC 207 and P-CSCF 209 of access office 206, and the S/BC 247 and P-CSCF 249 of access office 246, respectively. As will be described by the method of FIG. 5, server office 202 can serve as a primary communication resource for serving the communication needs of CD 205. Server office 204 may serve as a secondary communication resource for serving the communication needs of CD 205 when an unrecoverable or serious fault is detected, or any network element of server office 202 is otherwise unavailable as will be described by the method of FIG. 5.

Figure 3:
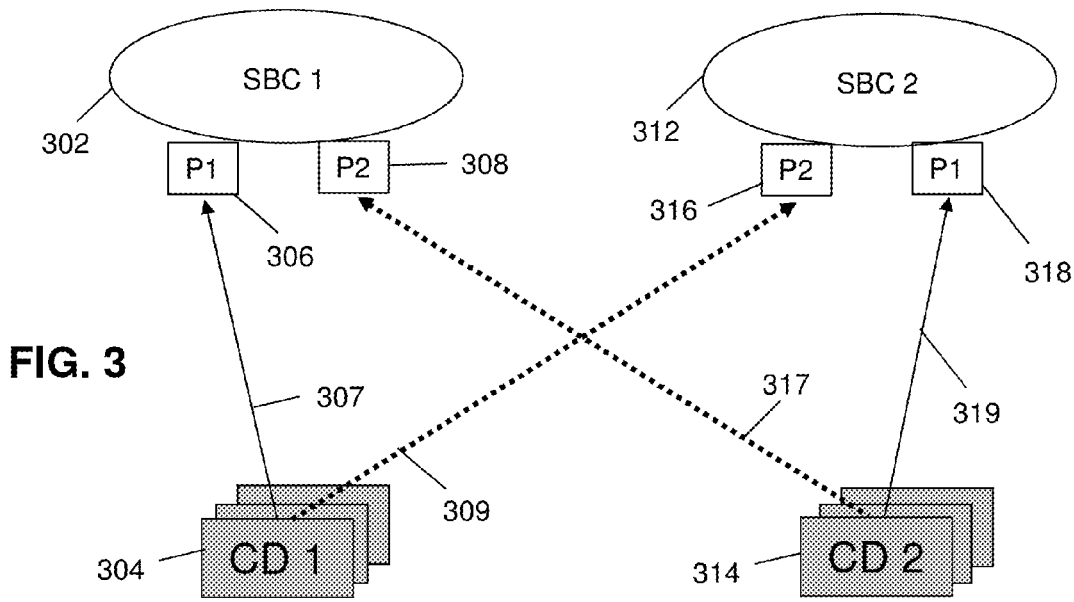
FIGS. 3-4 depict illustrative embodiments of communication devices communicatively coupled to primary and second session border controllers.
Figure 4:
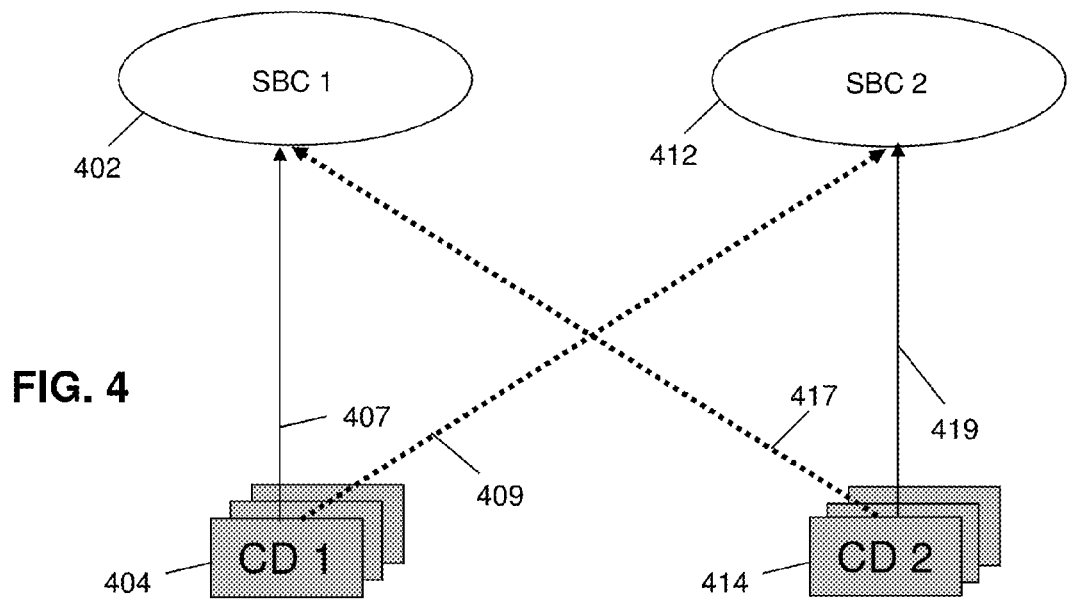

Each of FIGS. 3-4 depict first and second communication devices (CD1 and CD2) receiving primary and secondary communication services from respective SBC's. In FIG. 3, a first CD 304 receives primary services 307 from a first SBC 302 by way of a first port 306, and when the first CD 304 is unable to receive services from the first SBC 302, the first CD 304 is directed to seek secondary (backup) communication services 309 by way of a second port 316 of a second SBC 312. Similarly, a second CD 314 receives primary services 319 from a first port 318 of the second SBC 312, and when the second CD 314 is unable to receive services from the second SBC 312, the second CD 314 is directed to seek secondary services 317 from a second port 308 of the first SBC 302. The first and second ports 306 and 308 of the first SBC 302 can represent distinguishable IP addresses, or a single IP address with distinguishable logical ports. The distinguishable features of the first and second ports of each SBC can assist the first and second SBCs 302 and 312 to identify CDs registering for primary services versus secondary (backup) services as will be described below.

In another embodiment as shown in FIG. 4, a first CD 404 receives primary services 407 from a first SBC 402 and secondary services 409 from a second SBC 412. Similarly, a second CD 414 receives primary services 419 from the second SBC 412 and secondary services 417 from the first SBC 402. In this embodiment, the communication interface between the CDs and SBCs is indistinguishable. That is, each SBC can have a single port or IP address for receiving messages from CDs 404 and 414. The SBCs 402 and 412 can distinguish whether they are providing primary or secondary services to CD 404 and CD 414 by querying a local database or a remote database (at another IMS network element such as the ENUM, HSS, other network databases, or AS, etc.) to determine whether primary or secondary services are being provided by to CD 404 or CD 414, respectively. Alternatively, each CD 404 or CD 414 can inform the SBC if it is registering after a failover, thus enabling the SBC to distinguish between CDs.

It should be noted that the illustrations of FIGS. 3 and 4 can also be represented according to first and second groups of CDs 304 and 314 registering with the first and second SBCs 302 and 312 for primary or secondary services as shown in FIG. 3, and first and second groups of CDs 404 and 414 registering with the first and second SBCs 402 and 412 for primary or secondary services as shown in FIG. 4.

Figure 5:
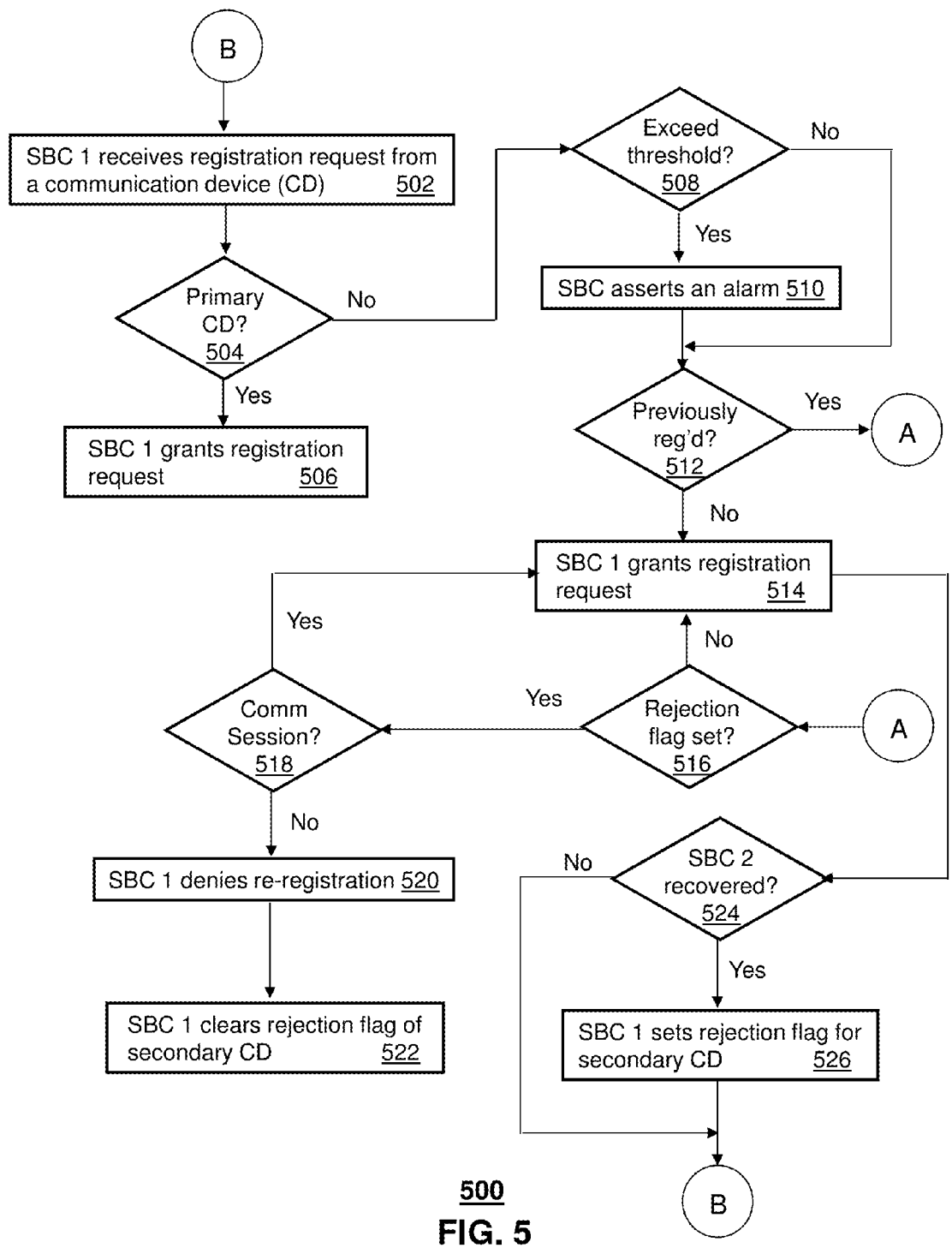
FIG. 5 depicts an illustrative embodiment of a method for providing backup services to the communication devices shown in FIGS. 1-4.

FIG. 5 depicts a method 500 that illustrates how backup services can be provided to the CDs shown in FIGS. 1-4. Method 500 can begin with step 502 in which SBC 1 receives a registration request from a CD. SBC 1 can be represented by SBC 1 of FIG. 3 or 4, and SBC 2, which will be referred to shortly, can be represented by SBC 2 of FIG. 3 or 4. With this in mind, in step 504, SBC 1 determines if the CD is a primary CD or secondary CD. That is, SBC 1 determines if the CD is assigned to SBC 1 as a primary source of communication services or a secondary (backup) source of communication services. In the embodiment of FIG. 3, this determination can be made by SBC 1 according to whether the registration request is received at port 1 or port 2. If received at port 1, SBC 1 can determine that the CD is a primary CD, if received at port 2, SBC 1 determines the CD is a secondary CD requesting backup services. As noted earlier, in one embodiment, port 1 can represent one internet protocol address, while port 2 represents another. With distinct internet protocol addresses, SBC 1 can also determine whether the CD is a primary or secondary CD. In another embodiment, ports 1 and 2 can be logical ports of a single internet protocol address. Other suitable ways to distinguish from where a registration request comes from can be used. In the embodiment of FIG. 4 as noted above, SBC 1 can also determine that the CD submitting the registration is a primary CD based on information provided by the CD, or by way of a look-up process performed by SBC 1 based on the identity of the CD.

If SBC 1 determines at step 504 that the CD is a primary CD, then it grants the registration request. If the CD is determined to be a secondary CD, SBC 1 proceeds to step 508 to determine if other secondary CDs have registered at SBC 1, and if the number of registered secondary CD's exceeds a threshold. If so, SBC 1 asserts an alarm at step 510. This step can represent an electronic message being sent to an operator agent who is tasked to resolve or at least mitigate network failures. For example, suppose SBC 1 is in Chicago, while SBC 2 is in Kansas. Upon receiving the alert message, the operator agent may determine from the identification information of the secondary CD's registered at SBC 1 that such devices would normally use the Kansas SBC rather than the Chicago SBC. The operator agent in Chicago can then contact an operator agent in Kansas to determine the extent of downtime of the Kansas SBC to determine when it may be appropriate to force the secondary CDs registered at SBC 1 to return to SBC 2 (i.e., their primary SBC in Kansas).

At step 512, the SBC 1 can determine if the secondary CD requesting the registration has previously registered with SBC 1. If this is a first time registration for the secondary CD which occurs when the CD is for the first time seeking backup services, then SBC 1 grants the registration request at step 514. If, however, the CD had previously registered, which indicates the registration is a re-registration request, the SBC can determine at step 516 if a rejection flag has been set in relation to the secondary CD submitting the registration request. The rejection flag can be set by SBC 1 at step 526 when, for example, SBC 1 receives an indication at step 524 that SBC 2 has recovered and is capable of accepting registrations.

SBC 1 can receive this indication from an operator agent that asserts by user input the rejection flag of one or more secondary CDs registered at SBC 1 when the operator agent determines SBC 2 has recovered and is capable of accepting registrations. SBC 1 can use the assertion of the rejection flags of one or more CDs for denying a re-registration request. Alternatively, or in combination, SBC 1 can receive notification from SBC 2. This notification can be invoked by user input generated by an operator agent managing SBC 2, or by configuring SBC 2 to automatically submit notices to backup SBC(s) when recovery events have been detected by SBC 2 such as, for example, when the SBC 2 detects that a failed resource previously affecting registrations has been restored.

Referring back to step 524, if SBC 1 does not detect that the rejection flag has been asserted for the secondary CD requesting registration, then SBC 1 grants the registration request at step 514. In certain situations, SBC 2 may be out of service for an extended period of time (e.g., hours) in which case, the rejection flag will not be asserted by steps 524-526 for quite some time. Since CDs can be configured to periodically re-register (e.g., every 15 mins), SBC 1 can receive re-registration requests from secondary CD's many times, which it will grant at step 514, until such time as SBC 2 has recovered, and the rejection flag has been asserted at step 526. If, however, at step 516, the rejection flag of the secondary CD is asserted, SBC 1 will proceed to step 518 and determine whether a communication session (data and/or voice) is active. If denying the registration request will tear down the communication session, then SBC 1 will grant the registration request at step 514 without clearing the rejection flag of the secondary CD.

If the secondary CD is not engaged in a communication session at step 518, then SBC 1 will proceed to step 520 where it will deny the re-registration request of the secondary CD, and clear the rejection flag of the CD at step 522 and any indication that the CD has previously registered with the SBC 1 to avoid confusion at step 512. To deny a re-registration request, SBC 1 can submit a message such as a session initiation protocol message that will cause the CD to register at SBC 2. In one embodiment, the session initiation protocol message can be a session initiation protocol error message such as a session initiation protocol 301 message, a session initiation protocol 302 message, a session initiation protocol 305 message, and so on. Other session initiation protocol messages that can cause the secondary CD to register with SBC 2 can be used by SBC 1.

Once the CD detects the error message, the CD will then attempt to register at SBC 2. If it is successful, then transitioning the secondary CD back to its primary SBC helps to rebalance resources of the communication system. If, however, the CD again fails to register at SBC 2, it will return to SBC 1 to register. Since the rejection flag was cleared at step 522, the CD will be able to once again register with SBC 1 at any time it so chooses.

It should be noted that method 500 as described above can be applied by the second SBC 312 in the same manner as the first SBC 302 when the first group of CDs 304 failover to the second SBC 312. It is further noted that method 500 can be applied to the configuration of FIG. 4. In this embodiment, the first or the second SBC 402 or 412 will need to query a local or remote system to determine which CDs are registering for primary services versus secondary (or backup services). Alternatively, the first and second CDs 404 and 414 can inform the first and second SBCs 402 and 412 when a failover has occurred.

Method 500 as described above provides a service provider the ability to force communication devices to regroup with their respective primary SBCs after failover events have been mitigated. By regrouping with primary SBCs, utilization of network resources remains balanced as prescribed by the service provider.

Figure 6:
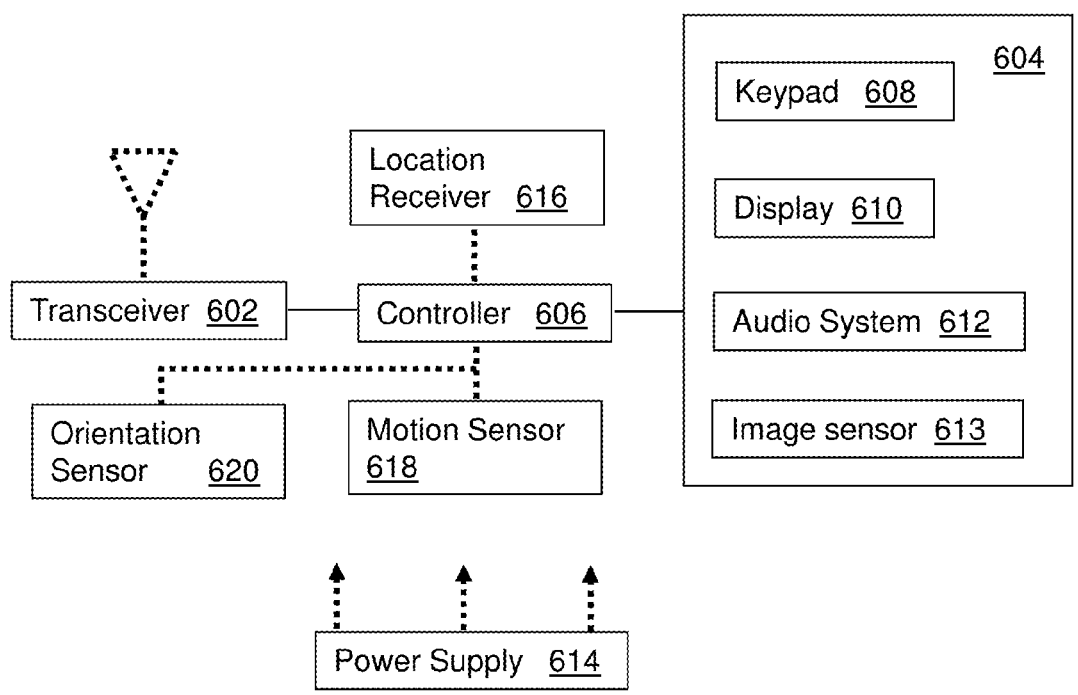
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1-4. In the case of an embodiment where the communication device 600 functions as the first SBC illustrated in FIGS. 3-4, the communication device 600 can be configured to receive registration requests from a plurality of communication devices, where the plurality of communication devices are assigned to a second SBC as a primary source for communication services, and where the registration requests are received responsive to the second SBC being unable to provide services to the plurality of communication devices. The communication device 600 can be further configured to receive a re-registration request from a first communication device of the plurality of communication devices, and transmit a message to the first communication device responsive to receiving the re-registration request to cause the first communication device to register with the second SBC.

To perform the above functions, the communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 400 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

The communication device 600 as described herein can operate with more or less of the circuit components shown in FIG. 6. These variant embodiments can be used in one or more embodiments of the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
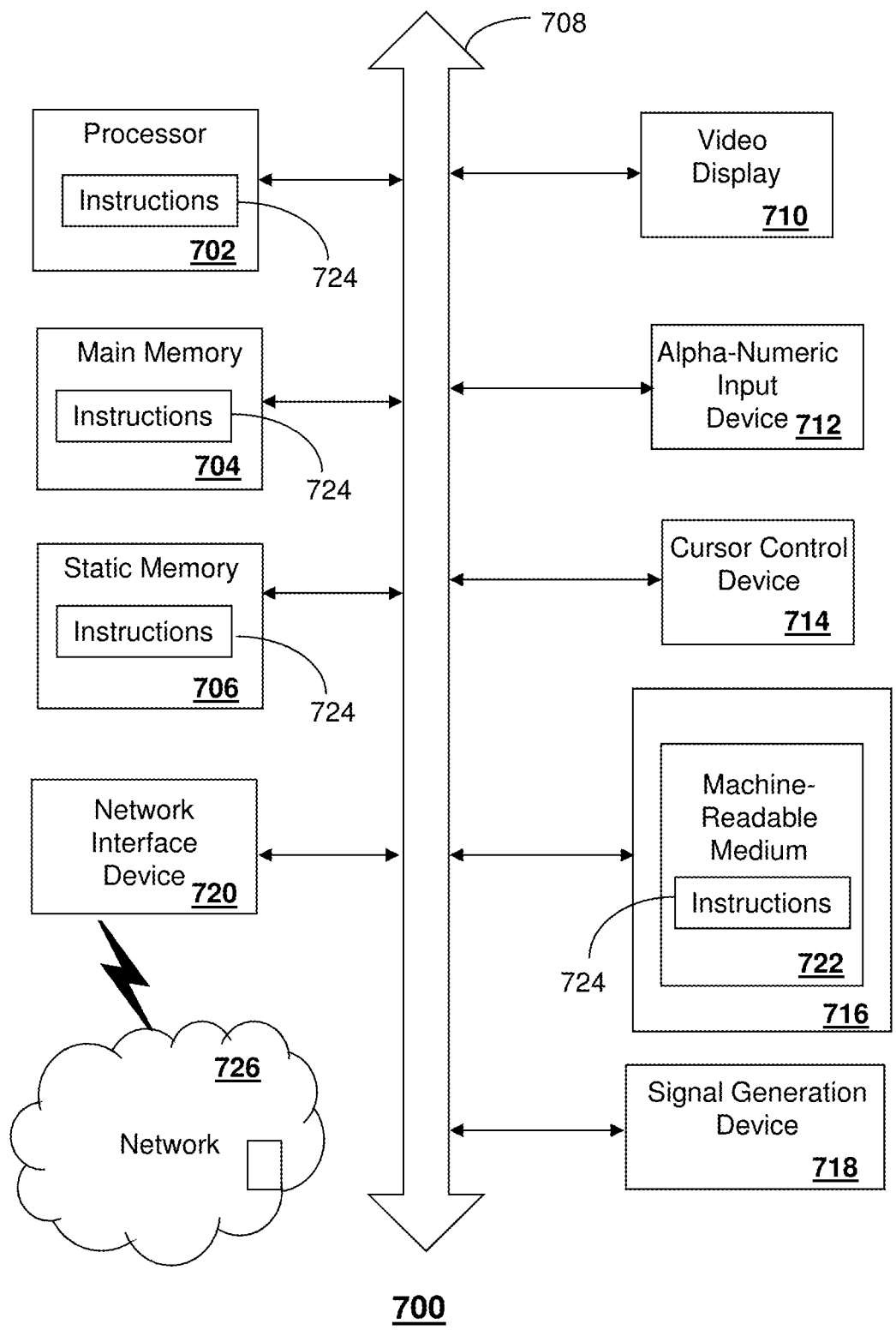
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as any of the devices of FIGS. 1-4. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first session border controller, comprising:
a memory that stores instructions; and
a processor coupled to the memory, wherein the processor, responsive to executing the instructions, performs operations comprising:
receiving and granting first registration requests from a first plurality of communication devices at a first port, wherein the first plurality of communication devices are assigned to the first session border controller as a primary source for communication services;
receiving and granting second registration requests from a second plurality of communication devices at a second port, wherein the second plurality of communication devices are assigned to a second session border controller as a primary source for communication services, and wherein the second registration requests are received responsive to the second session border controller being unable to provide services to the second plurality of communication devices;
receiving and granting a first re-registration request from a first communication device of the first plurality of communication devices;
receiving a second re-registration request from a second communication device of the second plurality of communication devices;
responsive to the second communication device satisfying a communication condition, denying the second re-registration of the second communication device;
responsive to determining that the communication condition has not been satisfied, granting the second re-registration of the second communication device and maintaining assertion of a rejection flag associated with the second communication device;
receiving a third re-registration request from the second communication device; and
denying the third re-registration of the second communication device responsive to the communication condition being satisfied and the rejection flag being asserted.

2. The first session border controller of claim 1, wherein the denying the second re-registration request comprises transmitting an error message to the second communication device that causes the second communication device to register with the second session border controller.

3. The first session border controller of claim 2, wherein the error message is a session initiation protocol message.

4. The first session border controller of claim 3, wherein the session initiation protocol message comprises one of a session initiation protocol 301 message, a session initiation protocol 302 message, or a session initiation protocol 305 message.

5. The first session border controller of claim 1, wherein the operations further comprise:
receiving a notification that the second session border controller is operational; and
wherein denying the second re-registration comprises denying the second re-registration of the second communication device responsive to the notification and responsive to the second communication device satisfying the communication condition.

6. The first session border controller of claim 5, wherein the notification is initiated by a field operator.

7. The first session border controller of claim 5, wherein the notification is initiated by the second session border controller.

8. The first session border controller of claim 1, wherein the communication condition comprises the second communication device not being engaged in a communication session when the second re-registration request is received.

9. The first session border controller of claim 1, wherein the operations further comprise:
detecting that a number of instances of the second registration requests received at the second port exceeds a threshold; and
asserting an alarm responsive to the detection.

10. The first session border controller of claim 1, wherein the operations further comprise:

receiving a fourth re-registration request from the second communication device after denying the second re-registration; and granting the fourth re-registration request of the second communication device.

11. The first session border controller of claim 10, wherein the granting of the fourth re-registration request is responsive to determining that the second communication device was unable to register with the second session border controller.

12. The first session border controller of claim 10, wherein the granting of the fourth re-registration request is responsive to a second rejection flag associated with the second communication device being cleared by the processor after the second re-registration request was denied.

13. The first session border controller of claim 1, wherein the first port is associated with a first internet protocol address for receiving expected registration requests, and wherein the second port is associated with a second internet protocol address for receiving unexpected registration requests.

14. A non-transitory computer-readable storage medium, comprising instructions, which when executed by a first session border controller, causes the first session border controller to perform operations comprising:

receiving and granting first registration requests from a first plurality of communication devices at a first port, wherein the first plurality of communication devices are assigned to the first session border controller as a primary source for communication services;

receiving and granting second registration requests from a second plurality of communication devices at a second port, wherein the second plurality of communication devices are assigned to a second session border controller as a primary source for communication services, and wherein the second registration requests are received responsive to the second session border controller being unable to provide services to the second plurality of communication devices;

receiving and granting a first re-registration request from a first communication device of the first plurality of communication devices;

receiving a second re-registration request from a second communication device of the second plurality of communication devices;

responsive to the second communication device satisfying a communication condition, denying the second re-registration of the second communication device;

responsive to determining that the communication condition has not been satisfied, granting the second re-registration of the second communication device and maintaining assertion of a rejection flag associated with the second communication device;

receiving a third re-registration request from the second communication device; and denying the third re-registration of the second communication device responsive to the communication condition being satisfied and the rejection flag being asserted.

15. The non-transitory computer-readable storage medium of claim 14, wherein the denying the second re-registration request comprises transmitting an error message to the second communication device that causes the second communication device to register with the second session border controller.

16. The non-transitory computer-readable storage medium of claim 15, wherein the error message is a session initiation protocol message.

17. The non-transitory computer-readable storage medium of claim 16, wherein the session initiation protocol message comprises a session initiation protocol 301 message, a session initiation protocol 302 message, or a session initiation protocol 305 message.

18. A method, comprising:

receiving and granting, by a first session border controller, first registration requests from a first plurality of communication devices at a first port, wherein the first plurality of communication devices are assigned to the first session border controller as a primary source for communication services;

receiving and granting, by the first session border controller, second registration requests from a second plurality of communication devices at a second port, wherein the second plurality of communication devices are assigned to a second session border controller as a primary source for communication services, and wherein the second registration requests are received responsive to the second session border controller being unable to provide services to the second plurality of communication devices;

receiving and granting, by the first session border controller, a first re-registration request from a first communication device of the first plurality of communication devices;

receiving, by the first session border controller, a second re-registration request from a second communication device of the second plurality of communication devices;

responsive to the second communication device satisfying a communication condition, denying, by the first session border controller, the second re-registration of the second communication device;

responsive to determining that the communication condition has not been satisfied, granting, by the first session border controller, the second re-registration of the second communication device and maintaining assertion of a rejection flag associated with the second communication device;

receiving, by the first session border controller, a third re-registration request from the second communication device; and denying, by the first session border controller, the third re-registration of the second communication device responsive to the communication condition being satisfied and the rejection flag being asserted.

19. The method of claim 18, wherein the denying the second re-registration request comprises transmitting an error message to the second communication device that causes the second communication device to register with the second session border controller.

* * * * *